US 6,919,063 B2

(12) United States Patent
Jang et al.

(10) Patent No.: US 6,919,063 B2
(45) Date of Patent: Jul. 19, 2005

(54) CARBON NANO-PARTICLE AND METHOD OF PREPARING THE SAME AND TRANSPARENT CONDUCTIVE POLYMER COMPOSITE CONTAINING THE SAME

(75) Inventors: Jyongsik Jang, Seoul (KR); Joon Hak Oh, Seoul (KR); Dong Cheol Kim, Seoul (KR)

(73) Assignee: Dong Woon International Co., Ltd., Seoul (KR)

( * ) Notice: Subject to any disclaimer, the term of this patent is extended or adjusted under 35 U.S.C. 154(b) by 131 days.

(21) Appl. No.: 10/387,326

(22) Filed: Mar. 11, 2003

(65) Prior Publication Data

US 2004/0009346 A1 Jan. 15, 2004

(30) Foreign Application Priority Data

Jun. 28, 2002  (KR) ............................... 10-2002-0036896
Sep. 17, 2002  (KR) ............................... 10-2002-0056448

(51) Int. Cl.$^7$ ............................................. C01B 31/00
(52) U.S. Cl. ............................. 423/445 B; 423/445 R; 423/448; 423/449.6; 977/DIG. 1
(58) Field of Search ............................. 423/448, 445 R, 423/445 B, 449.6; 428/402, 323, 408

(56) References Cited

U.S. PATENT DOCUMENTS

| | | | |
|---|---|---|---|
| 4,663,230 A | | 5/1987 | Tennent ...................... 428/367 |
| 5,098,771 A | | 3/1992 | Friend ......................... 428/209 |
| 5,547,748 A | * | 8/1996 | Ruoff et al. ................. 428/323 |
| 5,576,162 A | * | 11/1996 | Papadopoulos ............. 430/527 |
| 5,763,548 A | | 6/1998 | Matyjaszewski et al. ... 526/135 |
| 5,853,877 A | | 12/1998 | Shibuta ........................ 478/357 |
| 6,051,096 A | * | 4/2000 | Nagle et al. ................ 156/311 |
| 6,080,470 A | * | 6/2000 | Dorfman ..................... 428/216 |
| 6,537,515 B1 | * | 3/2003 | Baker et al. .............. 423/447.3 |
| 6,692,718 B1 | * | 2/2004 | Osawa ........................ 423/448 |
| 6,740,224 B1 | * | 5/2004 | Benavides et al. .......... 205/615 |
| 6,740,403 B2 | * | 5/2004 | Gogotsi et al. ............. 428/367 |
| 6,743,500 B2 | * | 6/2004 | Takeda et al. ........... 428/304.4 |
| 6,749,826 B2 | * | 6/2004 | Tillotson et al. ......... 423/447.2 |
| 6,765,949 B2 | * | 7/2004 | Chang ............................ 373/2 |
| 6,790,426 B1 | * | 9/2004 | Ohsaki .................... 423/447.2 |

OTHER PUBLICATIONS

Jang et al., "Fabrication of Ultrafine Conducting Polymer and Graphite Nanoparticles", Angew. Chem. 2002, 114, Nr. 21, pp. 4188–4191.*

Meier, W., "Nanostructure Synthesis Using Surfactants and Copolymers," *Current Opinion in Colloid Interface Science*, vol. 4, pp 6–14 (1999).

Oka, H., et al., "Incorporation of Iron Particles Into Carbon Films Derived from Polymide," *Solid State Ionics*, vol. 121, pp 157–163 (1999).

* cited by examiner

Primary Examiner—H. Thi Le
(74) Attorney, Agent, or Firm—Ladas & Parry LLP

(57) ABSTRACT

The present invention relates to a novel carbon nano-particle and a novel method of preparing the same and a transparent, conductive polymer composite containing the same. The carbon nano-particle has the mean diameter of 1 through 50 nm and the shape of sphere, rod or others, which is a novel material not known in the relevant art. Because of a particle size less than ½ of the shortest wavelength of a visible ray, a transparent resin containing the carbon nano-particle can maintain the transparency. Furthermore, the carbon nano-particle has the excellent electric conductivity and the ferromagnetic property, and can be made by a novel, low cost method entirely different from those of fullerene and carbon nanotube.

8 Claims, 3 Drawing Sheets

CARBON NANO-PARTICLE AND METHOD OF PREPARING THE SAME AND TRANSPARENT CONDUCTIVE POLYMER COMPOSITE CONTAINING THE SAME

BACKGROUND OF THE INVENTION

1. Field of the Invention

The present invention relates to a novel carbon nano-particle and a method of preparing the same and a transparent conductive polymer composite containing the same. More particularly, the present invention provide a novel carbon nano-particle in which carbon atoms forming a particle are bound in the graphite structure, and the mean diameter of the particle is 1 through 50 nm, preferably, 1 through 10 nm, and which has the shape of sphere, rod, or other shapes, and a novel method of preparing the carbon nano-particle, and a polymer composite, containing the carbon nano-particle, with the transparency as well as the excellent conductivity, in any case, the ferromagnetism.

2. Description of the Background Art

In recent years, information technology (IT), biotechnology (BT) and nanotechnology (NT) draw an intensive attraction as highly advanced technologies. Of them, the intensive researches in the nanotechnology (NT) are being conducted as to fullerenes, carbon nanotubes, etc., being formed of only carbon atoms and having the size of angstrom (Å) or nano meter (nm).

The fullerene is generally formed in a football shape in which 60 carbon atoms are bound to form twenty hexagonal structures and twelve pentagonal structures. The number of carbon atoms forming the fullerene is 60, 62, 64, 66, etc., depending upon the kinds thereof. The smallest C60 fullerene has a diameter of about 7 Å and the shape of sphere. The C70 fullerene has the major axis of about 8 Å and the minor axis of about 7 Å and is formed in a rugby ball shape.

The carbon nanotube is formed in the structure in which a graphene sheet is roiled in a cylindrical shape and has the diameter of 3.5 through 70 nm and the length ($\mu$m unit) of a few hundreds through a few thousands times of the diameter. The carbon nanotube can be classified into a single walled tube formed of one graphene sheet and a multi-walled tube in which 2 through 30 graphene sheets are formed in a concentric circle. Shapes of the carbon nanotube and methods of preparing the same are disclosed in U.S. Pat. No. 4,663,230.

The fullerene and carbon nanotube are prepared by a basically same method or similar method. Namely, they are made when carbon atoms vaporized are condensed under an inert environment. In order to increase the productivity of them, various methods have been developed. As examples of methods of preparing the carbon nanotube, there are an arc-discharge method which evaporates carbon atoms based on an electric discharge of two graphite rod electrodes; a laser vaporization method which evaporates carbon atoms radiating a laser to graphite; a plasma enhanced chemical vapor deposition method which glow-discharges carbon atoms using the high frequency electric field; a thermal chemical vapor deposition method; and a vapor phase growth method.

The above carbon nano-materials are expected to be applied to many fields in the future. While uses of the fullerene with the small size of less than 1 nm have been not developed yet, uses of the carbon nanotube are realized to various purposes such as reinforcing agents of composite material, anti-static electricity materials, and electromagnet-shielding materials, and the like.

For example, according to the U.S. Pat. No. 5,098,771, it is possible to obtain a high conductivity in such a manner that 0.5 through 10% by weight of carbon nanotube is added to a thermoplastic resin such as polyethylene, polypropylene, polyamide, polyvinylchrolide, etc. or a thermosetting plastic resin such as saturated polyester, alkyd, epoxy, etc. However, where carbon nanotubes are added to a transparent resin in order to prepare an optically-transparent, conductive film, a strong aggregate power is generated between carbon nanotubes during the coating process to black the film, so that the transparency of the resin is significantly decreased. For preparation of a transparent composite, the size of particles added to a resin or the size of particle aggregators should be below the half of the shortest wavelength of a visible ray (below about 200 nm).

U.S. Pat. No. 5,853,877 discloses a method for preventing aggregation by the surface-treating process of a carbon nanotube and thereby increasing the transparency of a composite. However, since the above method needs the use of a strong acid such as sulfuric acid, it makes the process difficult and also the composite containing such surface-treated carbon nanotubes has the transparency worse than Indium Tin Oxide (ITO).

Therefore, the so far known carbon nanotubes are not capable of effectively forming a transparent composite because of the limit of their size or the limit of methods of treating them.

Furthermore, since the so far developed methods include a step for evaporating carbon atoms, the carbon nanotubes prepared therefrom are relatively expensive; therefore, it is impossible to implement a mass production on the basis of these methods.

Therefore, the need for a novel carbon nano-material is increasing which has the high conductivity like carbon nanotubes and the size of less than ½ of the shortest wavelength of a visible ray and can be also prepared at a lower cost.

SUMMARY OF THE INVENTION

Accordingly, it is the object of the present invention to provide a novel carbon nano-particle, a novel method for preparing the same, and a transparent, conductive polymer composite containing the same, which can overcome the above problems encountered in the conventional art.

It is a first object of the present invention to provide a carbon nano-particle which is a novel nano-material, namely, the size of the same is an intermediate size of fullerenes and carbon nanotubes, and it has physical properties similar with the carbon nanotubes. Furthermore, the carbon nano-particle of the present invention has certain physical properties which the carbon nanotubes fail to provide: for example, a transparency, a ferromagnetic property, etc.

It is a second object of the present invention to provide a novel method for preparing the carbon nano-particle. So far, fullerenes, carbon nanotubes, etc. are conventionally prepared based on the vaporization/aggregation process of carbon atoms. However, in the method according to the present invention, the carbon nano-particle is prepared by a process step called as "Microemulsion polymerization" of polymer and a process step for carbonizing the resultant at a high temperature. The above method can be implemented at a low cost.

It is a third object of the present invention to provide a transparent and highly electric conductive polymer composite containing the carbon nano-particle. As described above, the carbon nano-particle according to the present invention has the high transparency even when it is added to a transparent polymer resin and also has the high electric conductivity.

It is a fourth object of the present invention to provide a carbon nano-particle with the ferromagnetism and a method of preparing the same. A polymerization catalyst which is used in a mico-emulsion polymerization, being one step of the preparation method of the present invention, or a separately added material can be converted into a ferromagnetic material during the carbonization step, whereby the carbon nano-particle becomes to have the ferromagnetism.

The inventors of the present invention performed many experiments and intensive researches and resultantly prepared a novel carbon nano-particle which has the mean particle diameter of 1 through 50 nm, preferably, 1 through 10 nm, a bonding type of the graphite structure between carbon atoms, and an excellent conductivity, based on a novel method which is entirely different from the conventionally known methods.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
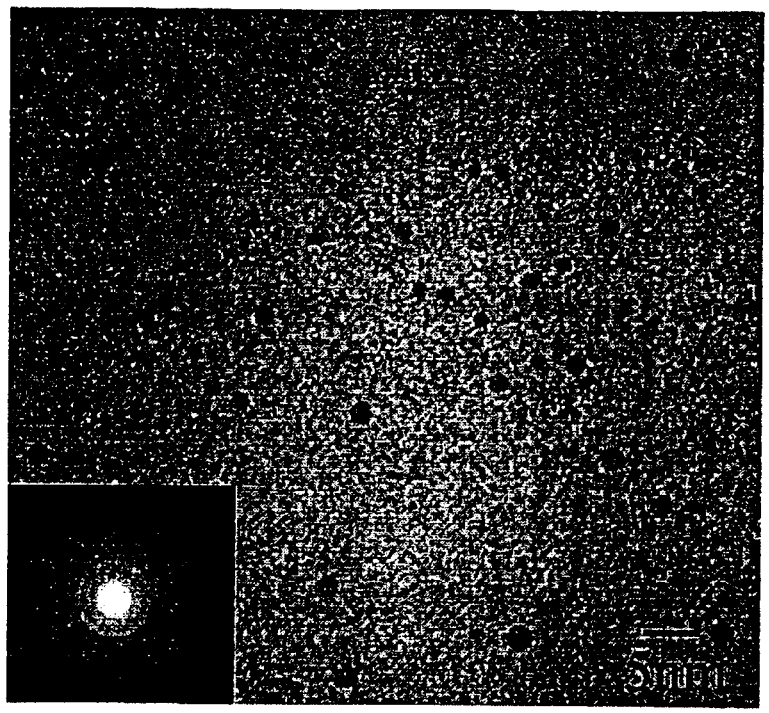
FIG. 1 is an image of the transmission electron microscopy (TEM) of a carbon nano-particle according to a first example of the present invention.

The carbon nano-particle according to the present invention has a bonding type of the graphite structure between carbon atoms, the mean particle diameter of 1 through 50 nm, and the shape of sphere, rod or other shapes.

The method for preparing a metallic, inorganic semiconductor nano particle with the size of more than 1 run has been reported, but a method for preparing a polymer nano-particle of a few rim size has not been known 80 far (Curr. Opin. Colloid Interface Sci., vol 4,pp 6–14. 1999). Furthermore, the carbon particle has not yet been reported in the art to which the present invention pertains, which has the intermediate size of a fullerene with the diameter of a few Angstroms and a carbon nanotube with the diameter of a few nm through a few tens of nm and the length of a few hundreds through a few thousands times (about $\mu$m) of the diameter. The aggregator of the fullerene may have a certain size of the above range, but the aggregate power of the fullerene is low, so that it is impossible to maintain the size of a nano unit in a solvent or medium. Furthermore, inter-bondings of a part of carbon atoms need pentagonal structures in order to form the fullerene, so that the structure of fullerene cannot be called as the graphite structure in which all bonding types of the carbon atoms are hexagonal.

Therefore, the carbon nano-particle according to the present invention can be defined as a novel material of being in the intermediate position between the fullerene and the carbon nanotube in views of its size and physical property. In addition, it can be also defined as a novel material of being in the intermediate position between the fullerene and the graphite.

The mean diameter of the particle is preferably 1 through 10 nm, and more preferably, 1 through 5 nm. The shape of the particle is preferably sphere. The size (mean diameter) and shape of the particle can be selectively adjusted based on a reaction condition.

Because the mean diameter of the carbon nano-particle according to the present invention does not reach ½ of the shortest wavelength of the visible ray (about 200 nm), even when blended and dispersed in a transparent polymer resin, etc., it is possible to maintain the transparency of the resin. In addition, since the carbon nano-particle according to the present invention does not have a high aggregating power unlike the fiber-shaped carbon nanotube, a dispersion process can be easily performed to improve the efficiency of the overall process. Furthermore, it was confirmed that where the carbon nano-particle is added into a resin at a certain amount, the resin has the excellent electric conductivity compared to the case of carbon nanotubes; therefore, the possibility of application thereof is highly expected.

In another embodiment, the carbon nano-particle according to the present invention can be prepared to have the ferromagnetism together with the excellent conductivity. As a method of preparing the carbon nano-particle with the ferromagnetism as well as excellent conductivity, a polymerization catalyst or a separately added material, existing as a dopant during a polymerization process, can be converted into a ferromagnetic material in a carbonization process, becoming a constitutional element of the carbon nano-particle. For example, an iron chloride III added as the polymerization catalyst or dopant does not have the ferromagnetism itself, but it is reacted with the small amount of oxygen under an inert environment during the carbonization process to be converted into a maghemite ($\gamma$-$Fe_2O_3$) with the ferromagnetism. The necessary amount of the material like the above in order for the carbon nano-particle to have the ferromagnetism may be different based on various conditions such as the kinds and characteristics of the polymerization catalyst and dopant. Therefore, it is impossible to limit the same. However, it is necessary to add more than the amount of catalyst generally required for polymerization.

The present invention also provides a novel method for preparing the carbon nano-particle.

The method of preparing the carbon nano-particle according to the present invention comprises the steps of:

(A) adding 0.01 through 0.9 mol of a surfactant into water in a thermostat reactor set to 1 through 40° C. and then agitating to form micells with the mean diameter of 1 through 50 nm;

(B) slowly dropping a monomer into the water and then dissolving the same to introduce the monomer into the micell;

(C) adding a polymerization catalyst into the water and then polymerizing the monomer in the micell;

(D) destroying the micell to recover a nano-polymer with the mean particle diameter of 1 through 50 nm; and (E) carbonizing the nano-polymer particle at 600 through 1200° C. under an inert environment to prepare a carbon nano-particle.

In the description of the present specification, the ranges of values such as a content, diameter, temperature, etc. represent the ranges that the preparation method according to the present invention can be optimized as long as they are not specifically defined in the present invention.

In the method of preparing the carbon nano-particle according to the present invention, the micell is used as a reaction space for polymerization which thereby limits the size of the resulting polymer particle to the range of a nano unit (1 through 50 nm). That organic polymer particle undergoes carbonization at a high temperature in the next step.

One of the features of the method of preparing a carbon nano-particle according to the present invention is to form the micell at the low temperature of 1 through 40° C. and to perform polymerization therein. The activity of a surfactant is largely decreased at a low temperature. Accordingly, the volume of the micell hole is also decreased, whereby the size of the polymer particle can be limited to the range of a nano unit. If the temperature of water is too low, the micell cannot be formed because of freezing of water. On the contrary, if the temperature of water is higher than a certain range, the volume of a micell hole is increased, whereby it is impossible to obtain a nano-degree polymer. Preferably, the temperature of water is 1 through 25° C.

The concentration of a surfactant based upon water affects the size of micell. If the concentration of the surfactant based upon water is less than 0.01 mol, it remains at a free molecule, thereby not forming a micell. If the concentration of the surfactant is more than 0.9 mol, an agitation process cannot be easily conducted because of the formation of liquid crystal and the increase of viscosity.

The surfactants to be used in the method according to the present invention are not particularly limited: for example, anionic surfactants such as alkylbenzene sulfonate salt, alkyl sulfate salt, polyoxyethylene alkyl ether sulfate salt, polyoxyethylene alkylphenyl ether sulfate salt, high fatty acid salt, etc.; non-ionic surfactants such as polyoxyethylene alkyl ether salt, polyoxyethylene alkylphenyl ether salt, etc., and cationic surfactants such as monoalkyl ammonium salt, dialkyl ammonium salt, trialkyl ammonium salt, tetraalkyl ammonium salt, etc. Of them, the cationic surfactants are more preferably such as octyltrimethylammonium bromine (OTAB), decyltrimethylammonium bromine (DeTAB), dodecyltrimethylammonium bromine (DTAB), tetradecyltrimethylammonium bromine (TTAB), cetyltrimethylammonium bromine (CTAB), etc.

Monomers and catalysts to be used in the method according to the present invention are not particularly limited, if they can be used in the emulsion polymerization at a low temperature. Examples of the monomers include styrene, butadiene, pyrrole, aniline, thiopen, methyl methacrylate, poly(3,4-ethylenedioxythiophene) (PEDOT), etc. In particular, a preferred monomer is pyrrole which provides polypyrrole being a conductive polymer. Examples of the catalysts include hydrogen peroxide, cumyl peroxide, $FeCl_3$, ammonium persulfate, $CuCl_2$, etc. Of them, a preferable catalyst is $FeCl_3$ useful for the polymerization of pyrrole. For a polymerization process in the present invention, a redox polymerization may be preferably used which can promote the initiation of reaction at a low temperature, and also an atom transfer radical polymerization (ATRP) may be used which has an excellent control over reaction. The detailed contents of the ATRP are described in U.S. Pat. No. 5,763,548, which is incorporated in the present invention as a reference.

Said catalyst may be added into a reaction mixture with being dissolved in the small amount of water. The amount of the catalyst is preferably 1 through 5 mol with respect to 1 mol of monomer.

The reaction time for polymerization depends upon the kinds of monomer and catalyst used, and other reaction conditions, and is generally 1 through 12 hours.

Alcohol may be added to destroy the micell in which the polymerization reaction was completed; for example, methanol dissolves surfactants for thereby destroying the micell and dissolves catalysts such as $FeCl_3$. In order to accelerate separation of the synthesized polymer nano-particle, the certain amount of non-solvent such as isooctane, etc. may be added.

The separated polymer nano-particle has the mean particle diameter of about 1 through 50 nm, preferably, 1 through 10 nm, more preferably, 1 through 5 nm. The shapes of the particle may be different depending upon the shape of micell. Generally, as the amount of surfactant used increases, the spherical shape can changes to the rod shape. The synthesized polymer nano-particle may have a tetrahedron shape, cubic shape, acicular shape, rice-straw shape, ribbon shape, etc. by its self-aggregation.

The separated polymer nano-particle needs to be dried prior to carbonization, and preferably is naturally dried at the room temperature to obtain a pure polymer.

Then, the dried polymer nano-particle is carbonized under an inert environment or vacuum at the high temperature of 600 through 1200° C. The carbonization process is preferably performed in an electric furnace filled with the inert gas such as argon. The preferred temperature of carbonization is 800 through 1000° C. The size of the particle slightly decreases after the carbonization process, but it is within the range of 1 through 50 nm being the size of polymer nano-particle before the carbonization process.

The atom analysis and infrared spectrometer analysis performed on the carbonized nano-particle showed the fact that the nano-particle consists of only carbon atoms. Moreover, the X-ray diffraction (XRD) analysis showed the fact that the nano-particle has the graphite structure.

Within the range of the present invention, other additional processes can be included in the above preparation method. For example, the nano polymer prior to the carbonization process can be dispersed in a polar solvent such as methanol to form the peculiar self-assembly such as a dentritic structure and a spherulite shape. In addition, the small amount of a transition metal and/or chloride compound can be added for accelerating the graphiting during the carbonization process and increasing the electric conductivity. Such effect of the transition metal and chloride compound during carbonization is well known (Oka, H. et al., Solid state ionics, 121, 151–163(1999).

As described above, for the purpose of providing the ferromagnetism in addition to the high conductivity to the carbon nano-particle, a material may be added which dose not the magnetism property itself but is converted into a ferromagnetic material such as maghemite ($\gamma$-$Fe_2O_3$) by reaction with the small amount of oxygen being in the inert gas environmental during the carbonization process. However, where $FeCl_3$ is used as a polymerization catalyst, $FeCl_3$ can remain as a dopant after the polymerization process and then be converted into a ferromagnetic material during the carbonization process, whereby the resulting carbon nano-particle can have the ferromagnetism even without addition of other material as the above.

The present invention also provides a transparent conductive polymer composite which contains the carbon nano-particle.

As described above, for a polymer composite with the transparency, the size of particle added or the size of aggregators of the particles must be less than ½ of the shortest wavelength of a visible ray. Since the carbon nano-particle of the present invention has the mean particle diameter of 1 through 50 nm, preferably, 1 through 10 nm, more preferably 1 through 5 nm and can be easily dispersed in a polymer resin, it meets the requirements for maintaining the transparency. Therefore, by blending the carbon nano-particle of the present invention into a transparent polymer resin, it is possible to make a polymer composite with the transparency while maintaining the electric conductivity.

Examples of the transparent polymer resins to be used in the present invention include polyethylene, polypropylene, polystyrene, polycarbonate, polyethylene terephthalate, polymethyl methacrylate, etc. Of them, the polycarbonate can be preferably used in view of strength and anti-scratch property.

The large amount of the carbon nano-particle may be added into the resin only for the purpose of providing the electric conductivity; however, in considering the transparency of polymer composite, the addition amount of the carbon nano-particle is preferably 5 through 15% by weight based upon the weight of the polymer composite.

These transparent, conductive polymer composites can be used for various applications: as examples, anti-static electricity material, electromagnetic wave-shielding material, ITO-substituting material, electric light emitting device, etc. The conductive polymer composite can be made in various shapes, preferably, in a film shape.

One of the features of a carbon nano-particle according to the present invention with the size of a few nanometer is in that the surface area thereof is large. Such carbon nano-particle can be used for an environmental affinitive process such as the recovery of heavy metals through the surface modification of the carbon nano-particle, and can be also used for the recovery and recycle of carbon nano-particles themselves and the drug delivery system (DDS) by using the ferromagnetic property thereof.

Since the methods of preparing a polymer composite containing solid particles are known in the art to which the present invention pertains, the description thereof is omitted in this specification.

The examples of the present invention will be described in detail with reference to the following examples, and the scopes of the present invention are not limited thereby.

EXAMPLE 1

About 80 ml of distilled water was poured in a reactor of 1 L installed in a thermostat bath set to 25° C. Thereafter, 6 g of decyltrimethylammonium bromide (DTAB) was added and then agitated at the rate of about 400 rpm to form micells. 2 g of pyrrole monomers were slowly dropped in the reactor using a pipette. 11.12 g of $FeCl_3$ (the mole rate of pyrrole/$FeCl_3$=1/2.3) were dissolved in 10 ml of distilled water and then the thusly obtained solution was added into the reactor. After agitation for about 4 hours at 25° C., about 500 ml of methanol was added into the reactor to destroy the micells. The reaction solution was moved into a separatory funnel, and then the separatory funnel was smoothly shaken a few times to help blending of the solution. In order to increase the separation rate of the synthesized polymer nano-particle (polypyrrole nano-particle), about 100 ml of iso-octane was added as a non-solvent into the separatory funnel. The upper layer of iso-octane and methanol was removed using a pipette, and then the remaining lower layer was naturally evaporated at the room temperature to recover polypyrrole nano-particles. These polypyrrole nano-particles were moved into an electric furnace and then heated to about 900° C. under the nitrogen environment with the heating rate of 3° C./minute. Thereafter, the particles were carbonized for 5 hours at about 900° C. and then cooled at the room temperature to obtain carbon nano-particles.

Figure 2:
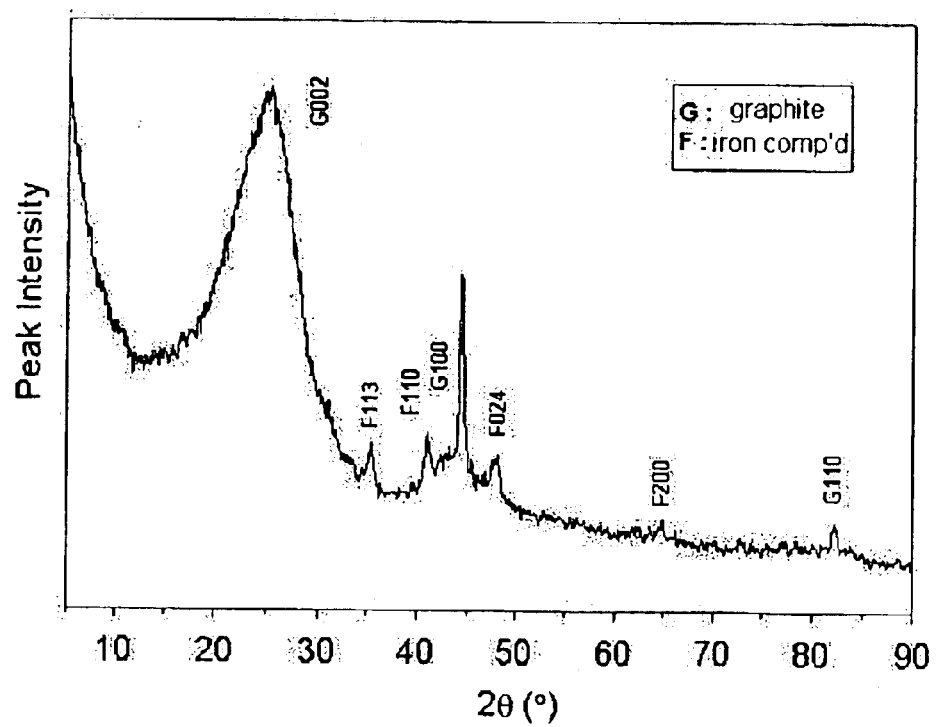
FIG. 2 is a XRD graph of a carbon nano-particle prepared according to a first example of the present invention.

FIG. 1 shows a TEM image of the carbon nano-particles and the diffraction pattern thereof. As shown in FIG. 1, it was confirmed that crystal-type carbon spherical particles with the mean particle diameter of 2 nm were obtained. In addition, FIG. 2 shows the X-ray diffraction analysis graph of the carbon nano-particles. As shown in FIG. 2, it was confirmed that the carbon nano-particles have the graphite structure (002, 100 Bragg reflection of the graphene).

EXAMPLE 2

1% by weight, 3% by weight and 10% by weight of the carbon nano-particles with the mean particle diameter of 2 nm, prepared in the example 1, were solution-blended into polycarbonate (average molecule weight: 13,800), respectively. Then, the blend was spin-coated on a cover glass by the thickness of 270 nm (measured by alpha step method) to prepare a film. Tetrahydrofurane (THF) was used as a solvent for the solution blending. For comparison therewith, the non-carbonizing polymer nano-particle (polypyrrole nano-particle), which was not undergone the carbonization process in the Example 1, and the carbon nanotube (from Aldrich company) were respectively solution-blended with polycarbonate to prepare films was measured with UV/VIS spectrophotometer in a visible ray region. Table 1 (below) shows the average of transmittancy based on the wavelength. As shown in Table 1, the carbon nano-particle has a higher average transmittancy than carbon nanotubes. For example, in addition of 10% by weight, the PC composite film containing the carbon nano-particles according to the present invention had the transmittancy of 83%, while the PC composite film containing carbon nanotubes had the transmittancy of 68%.

TABLE 1

| Kinds of film | Addition amount (% by weight) | Average transmittancy (%) |
| --- | --- | --- |
| Polycarbonate (PC) film | — | 95 |
| PC film containing | 1 | 92 |
| Polypyrrole nano-polymer | 3 | 90 |
|  | 10 | 85 |
| PC film containing carbon | 1 | 91 |
| nano-particle | 3 | 89 |
|  | 10 | 83 |
| PC film containing carbon nanotube | 1 | 86 |
|  | 3 | 80 |
|  | 10 | 68 |

EXAMPLE 3

Figure 3:
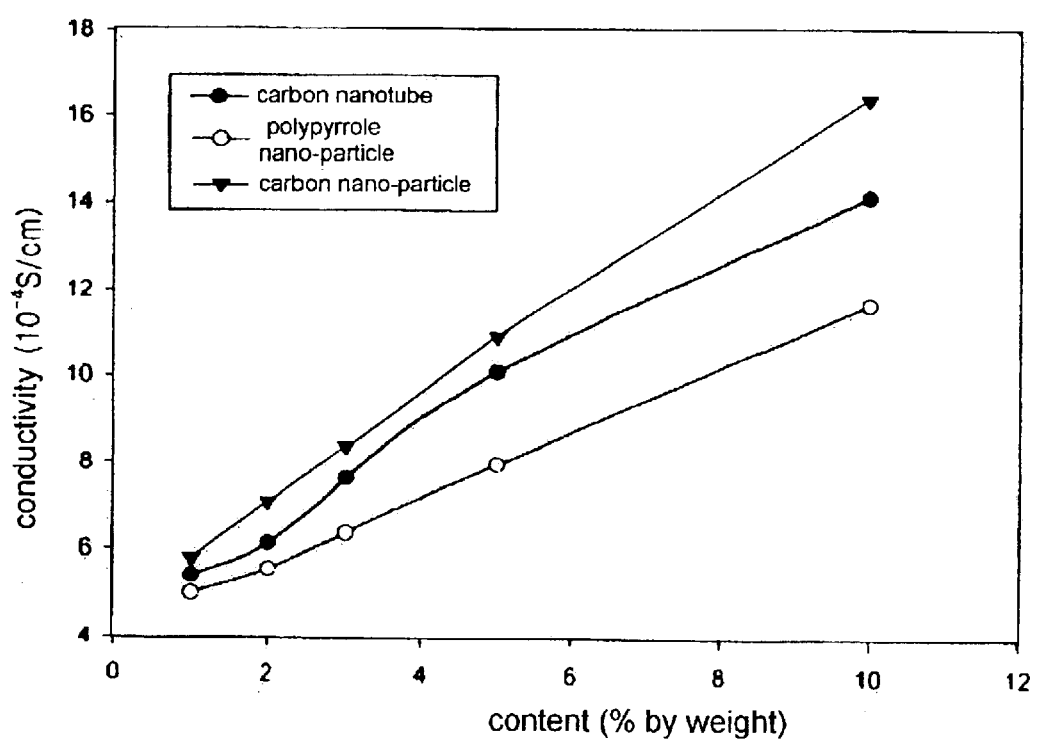
FIG. 3 is a graph of the content-based electric conductivity of composites prepared by blending carbon nano-particles according the present invention, polypyrrole nano-particles, and carbon nanotubes in polycarbonate resin, respectively.

Specimens were prepared in the same manner as Example 2 except that the polymers nano-particle (polypyrrole nano-particle) and carbon nano-particles and carbon nanotubes were respectively added at 1% by weight, 2% by weight, 3% by weight, 5% by weight, and 10% by weight to make them the pellet shape. The electrical conductivity of the specimens was measured according to the Van der Pauw method. The results of the above measurement are shown in FIG. 3. As shown in FIG. 3, the PC specimens containing the carbon nano-particles according to the present invention had the higher conductivity than any others. For example, in addition of 10% by weight, the PC specimen containing the carbon nano-particle has the electrical conductivity of $16\times10^{-4}$ s/cm, which shows that the PC specimen containing the carbon nano-particle according to the present invention has the significantly high conductivity, compared to the PC specimen containing the carbon nanotube which has the conductivity of $14\times10^{-4}$ s/cm.

EXAMPLE 4

Figure 4:
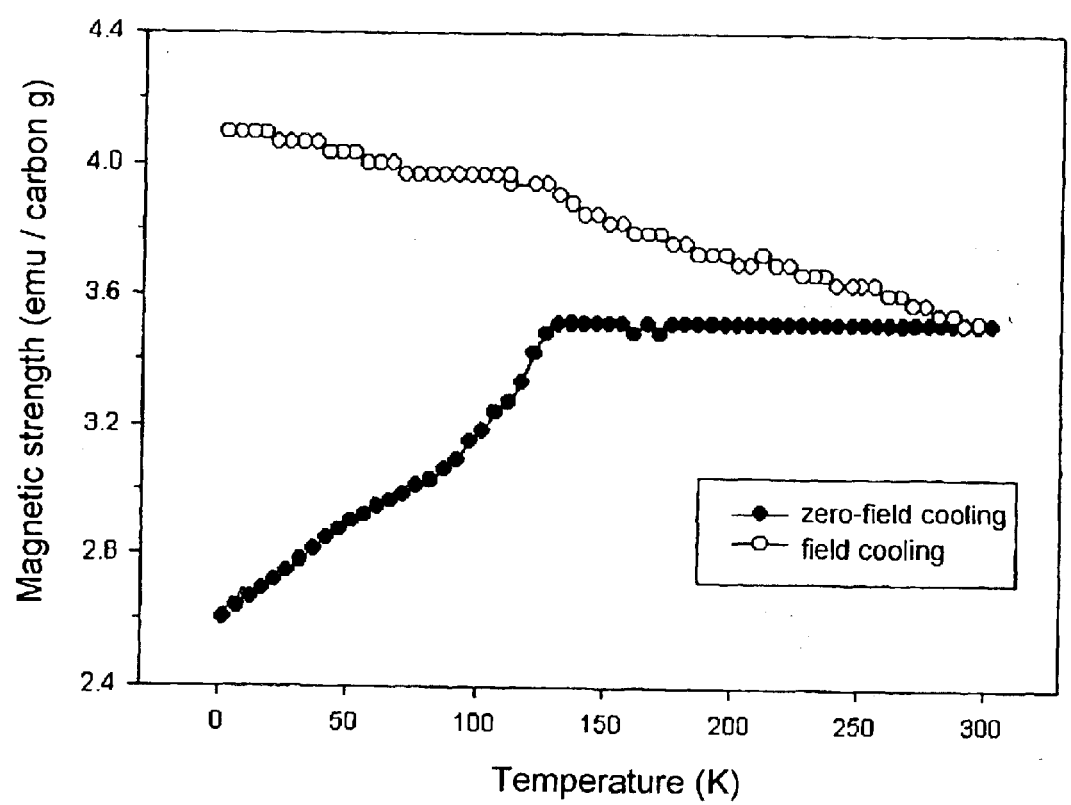
FIG. 4 is a graph of the temperature-based magnetism variation of a carbon nano-particle according to a first example of the present invention.

The magnetism of the carbon nano-particles with the mean particle diameter of 2 nm, being prepared in Example 1, was measured using the Superconducting Quantum Interference Device (SQUID) in the function of temperature. The range of the measurement temperature was from 5K to 300K, and the strength of magnetic field applied was 100 Oe. The result of the above measurement is shown in FIG. 4. As shown in FIG. 4, the magnetic anisotropic coefficient value obtained based upon the measurement value was $2.4\times10^8$ ergs/cm$^3$, which means that the carbon nano-particle according to the present invention has the ferromagnetism.

As described above, the carbon nano-particle according to the present invention is a novel material which has not been so far disclosed in the art to which the present invention pertains. Since the carbon nano-particle according to the present invention has the size of less than ½ of the shortest wavelength of a visible ray, even when added to a transparent polymer resin, it shows the transparency as well as the excellent conductivity, in any case, the ferromagnetism. In addition, the carbon nano-particle according to the present invention can be made at a very low cost by a novel method different from those of fullerene or carbon nanotube. Therefore, the carbon nano-particle according to the present invention can be applied as additives with the excellent conductivity or additives with the ferromagnetism, thus it is expected to be used as new multi-functional materials such as optical display materials, electromagnetic wave shielding materials, and anti-static electricity materials in the future.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A method for preparing a carbon nano-particle that has a graphitic bonding structure and a mean particle diameter between 1 and 50 nm comprising (A) adding 0.01 through 0.9 mol of a surfactant to water in a thermostat reactor set between 1 and 40° C. and then agitating to form micells with a mean diameter between 1 and 50 nm;

(B) slowly dropping a monomer into the water and dissolving the same to introduce the monomer into the micells;

(C) adding a catalyst into the water to polymerize the monomer in the micell;

(D) destroying the micells to recover a polymer nano-particle with a mean particle diameter between 1 and 50 nm; and (E) carbonizing the polymer nano-particle between 600 and 1200° C. under an inert environment to prepare a carbon nano-particle.

2. The method of claim 1, wherein the temperature of water is between 1 and 25° C., and the carbonizing temperature is between 800 and 1000° C.

3. The method of claim 1, wherein said surfactant is selected from the group consisting of octyltrimethylammonium, bromine (OTAB), decyltrimethylammonium bromine (DeTAB), dodecyltrimethylammonium bromine (DTAB), tetradecyltrimethylammonium bromine (TTAB), and cetyltrimethylammonium bromine (CTAB).

4. The method of claim 1, wherein said monomer is pyrrole, and said catalyst is a FeCl$_3$.

5. The method of claim 4, further comprising converting said FeCl$_3$ used as a polymerization catalyst into Maghemite magnetic material during the carbonization process.

6. The method of claim 1, wherein the micells are destroyed by adding methanol, and the recovery of the polymer nano-particle is accelerated by adding an iso-octane.

7. The method of claim 1, wherein the particle contains a ferromagnetic compound which was derived from a polymerization catalyst and/or added separately.

8. The method of claim 1, comprising forming the particle in the shape of a sphere, rod or others.

* * * * *